US012332522B2

(12) United States Patent
Sogabe

(10) Patent No.: US 12,332,522 B2
(45) Date of Patent: Jun. 17, 2025

(54) LIQUID CRYSTAL DISPLAY DEVICE

(71) Applicant: Japan Display Inc., Tokyo (JP)

(72) Inventor: Mitsufumi Sogabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/243,405

(22) Filed: Sep. 7, 2023

(65) Prior Publication Data

US 2024/0094583 A1 Mar. 21, 2024

(30) Foreign Application Priority Data

Sep. 15, 2022 (JP) ................... 2022-147401

(51) Int. Cl.
*G02F 1/1343* (2006.01)
*G02F 1/1335* (2006.01)
*G02F 1/1362* (2006.01)

(52) U.S. Cl.
CPC .. *G02F 1/134372* (2021.01); *G02F 1/133512* (2013.01); *G02F 1/133531* (2021.01); *G02F 1/134327* (2013.01); *G02F 1/136286* (2013.01)

(58) Field of Classification Search
None
See application file for complete search history.

(56) References Cited

U.S. PATENT DOCUMENTS

| | | | |
|---|---|---|---|
| 2009/0225267 A1* | 9/2009 | Atarashiya | G02F 1/134363 349/39 |
| 2010/0157229 A1* | 6/2010 | Sakurai | G02F 1/134363 349/141 |
| 2013/0256669 A1* | 10/2013 | Jang | G02F 1/133707 257/59 |
| 2015/0234189 A1 | 8/2015 | Lyons | |
| 2019/0285956 A1* | 9/2019 | Song | G02F 1/136227 |
| 2022/0171226 A1* | 6/2022 | Murata | G02F 1/1368 |

FOREIGN PATENT DOCUMENTS

JP 2017-511041 A 4/2017

\* cited by examiner

*Primary Examiner* — Shan Liu
(74) *Attorney, Agent, or Firm* — K&L Gates LLP

(57) ABSTRACT

A liquid crystal display device includes at least one scanning signal line extending in a first direction, at least one data signal line intersecting with the at least one scanning signal line, and a pixel including a pixel electrode, a common electrode opposite the pixel electrode, and a liquid crystal layer. The common electrode includes a slit, and the slit is arranged in a region overlapping the pixel electrode, the slit includes a slit center portion extending in a straight line at a first angle with respect to the first direction, the at least one data signal line includes a portion adjacent to the slit center portion and extends at a second angle with respect to the first direction, and the first angle and the second angle are different.

5 Claims, 12 Drawing Sheets

LIQUID CRYSTAL DISPLAY DEVICE

CROSS-REFERENCE TO RELATED APPLICATIONS

This application claims the benefit of priority to Japanese Patent Application No. 2022-147401, filed on Sep. 15, 2022, the entire contents of which are incorporated herein by reference.

FIELD

An embodiment of the present invention relates to a structure of a pixel of a liquid crystal display device.

BACKGROUND

Virtual reality (VR) goggles display three-dimensional objects in three dimensions and change the display of the three-dimensional image as the viewpoint moves, thereby creating a sense of virtual reality for the user. For example, VR goggles with a lens assembly that allows users to view split-screen images on a display screen through two lenses are disclosed (for example, refer to Japanese Unexamined Patent Application Publication No. 2017-511041).

SUMMARY

A liquid crystal display device in an embodiment according to the present invention includes at least one scanning signal line extending in a first direction, at least one data signal line intersecting the at least one scanning signal line, and a pixel including a pixel electrode, a common electrode opposite the pixel electrode, and a liquid crystal layer. The common electrode includes a slit arranged in a region overlapping the pixel electrode, the slit includes a slit center portion extending in a straight line at a first angle with respect to the first direction, the at least one data signal line includes a portion adjacent to the slit center portion and extends at a second angle with respect to the first direction, and the first angle and the second angle are different.

A liquid crystal display device in an embodiment according to the present invention includes a scanning signal line extending in a first direction, a data signal line intersecting the at least one scanning signal line, and a pixel including a pixel electrode, a common electrode opposite the pixel electrode, and a liquid crystal layer. The pixel electrode includes a pixel electrode center portion extending in a straight line at a first angle with respect to a first direction, the data signal line includes a portion adjacent to the pixel electrode center portion and extends at a second angle with respect to the first direction, and the first angle and the second angle are different.

DESCRIPTION OF EMBODIMENTS

Hereinafter, embodiments of the present invention are described with reference to the drawings. However, the present invention can be implemented in many different aspects, and should not be construed as being limited to the description of the following embodiments. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to previous drawings may be given the same reference sign (or a number followed by a, b, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

For each embodiment of the present invention, when the first conductive layer, first insulating layer, and semiconductor layer are stacked on the substrate in this order, a direction from the first conductive layer to the semiconductor layer is referred to as up or above. On the other hand, a direction from the semiconductor layer to the first conductive layer is referred to as lower or below. In the following description, for example, the expression "the oxide semiconductor layer on the substrate" merely describes the vertical relationship between the substrate and the oxide semiconductor layer as described above, and other members may be arranged between the substrate and the oxide semiconductor layer. Above or below means a stacking order in a structure in which multiple layers are stacked, and when it is expressed as a pixel electrode above a transistor, it may be a positional relationship where the transistor and the pixel electrode do not overlap each other in a plan view.

First Embodiment

A configuration of a liquid crystal display device according to the first embodiment of the present invention will be described with reference to FIG. 1 through FIG. 10. The liquid crystal display device of the present embodiment has a structure in which a liquid crystal layer is arranged between a pair of substrates.

1. Configuration of Liquid Crystal Display Device

Figure 1:
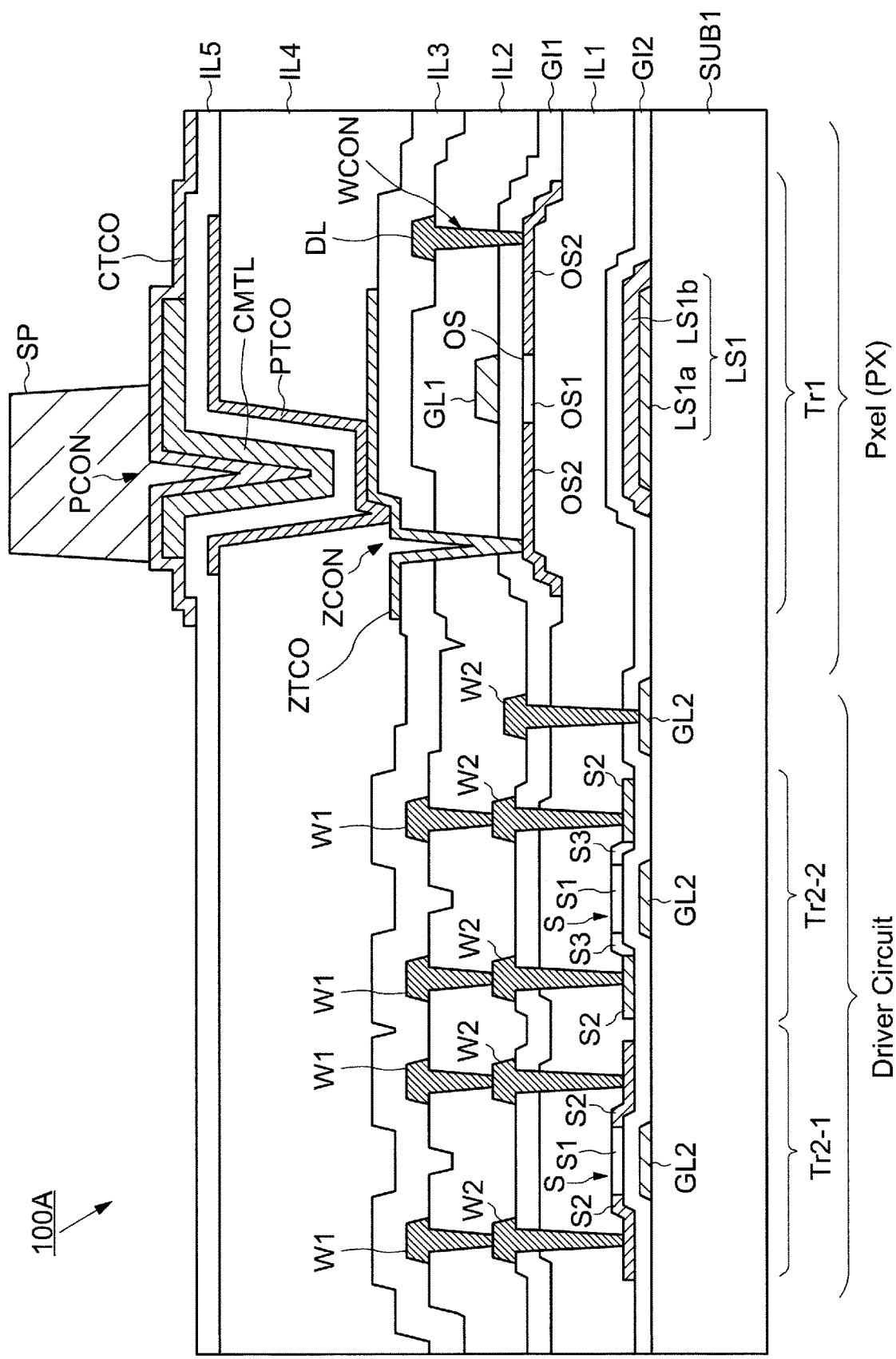
FIG. 1 is a cross-sectional view of a configuration of a first substrate side of a liquid crystal display device according to an embodiment of the present invention.

FIG. 1 shows a cross-sectional view of a first substrate SUB1, which is one of the substrates configuring a liquid crystal display device 100A. A first transistor Tr1, a second transistor Tr2, a data signal line DL, first wirings W1, second wirings W2, a connecting electrode ZTCO, a pixel electrode PTCO, a common auxiliary electrode CMTL, and a common electrode CTCO are arranged on the first substrate SUB1. The first transistor Tr is an element included in a pixel PX, and the second transistor Tr2 is an element included in a driver circuit. The driver circuit is a circuit that drives the pixel PX.

The symbol "TCO" is included in the connecting electrode ZTCO, pixel electrode PTCO, and common electrode CTCO. The symbol "TCO" has no specific meaning, but may be used to indicate transparent conductive oxides such as ITO, ZnO, IZO, or similar materials.

1-1. First Transistor Tr

The first transistor Tr includes a semiconductor layer OS, a gate insulating layer GI1, and a gate electrode GL1. The semiconductor layer OS is, for example, an oxide semiconductor layer or a polycrystalline silicon layer. The gate electrode GL1 faces the semiconductor layer OS. The gate insulating layer GI1 is arranged between the semiconductor layer OS and the gate electrode GL1. FIG. 1 shows an example of a top-gate structure in which the semiconductor layer OS is arranged on the substrate SUB side from the gate electrode GL1. The first transistor Tr may also be a bottom-gate type transistor in which the gate electrode GL1 and the semiconductor layer OS are in the reverse position.

The semiconductor layer OS includes a first semiconductor region OS1 and a second semiconductor region OS2. The first semiconductor region OS1 is a region where the semiconductor layer OS overlaps the gate electrode GL1 and corresponds to a region called a channel in the first transistor Tr1. The second semiconductor region OS2 corresponds to the source region and the drain region. The first transistor Tr is controlled to be on and off according to the gate voltage applied to the gate electrode GL1.

A second insulating layer IL2 is arranged on the gate electrode GL1. The data signal line DL is arranged on the second insulating layer IL2. The data signal line DL is connected to the second semiconductor region OS2 via a contact hole WCON arranged in the second insulating layer IL2 and the gate insulating layer GI1. The data signal line DL is a wiring that transmits data signals related to image gradation. A third insulating layer IL3 is arranged on the second insulating layer IL2 and the data signal line DL. The connecting electrode ZTCO is arranged on the third insulating layer IL3. The connecting electrode ZTCO is connected to the second semiconductor region OS2 via a contact hole ZCON arranged in the third insulating layer IL3, the second insulating layer IL2, and the gate insulating layer GI1. The connecting electrode ZTCO is formed by a transparent conductive film.

A fourth insulating layer IL4 is arranged on the connecting electrode ZTCO. The fourth insulating layer IL4 is an insulating layer also called a planarization layer. The fourth insulating layer IL4 embeds the unevenness formed by the underlying semiconductor layer OS, gate electrode GL1, and the like to provide a flat surface. The pixel electrode PTCO is arranged on top of the fourth insulating layer IL4. The pixel electrode PTCO is connected to the connecting electrode ZTCO in the contact hole PCON arranged in the fourth insulating layer IL4. The pixel electrode PTCO is formed of a transparent conductive film.

A fifth insulating layer IL5 is arranged on the pixel electrode PTCO. The common auxiliary electrode CMTL and the common electrode CTCO are arranged on the fifth insulating layer IL5. The common auxiliary electrode CMTL and the common electrode CTCO are in contact in a cross-sectional view, but have different patterns in a planar view. The common auxiliary electrode CMTL is a metal layer. The common electrode CTCO is a transparent conductive layer. Electrical resistance of the common auxiliary electrode CMTL is lower than that of the common electrode CTCO. The common auxiliary electrode CMTL also functions as a light shielding layer. For example, the common auxiliary electrode CMTL is arranged in the contact hole PCON of the fourth insulating layer IL4 through the fifth insulating layer IL5 to shield this part from light. The common auxiliary electrode CMTL, for example, blocks light from adjacent pixels and prevents the occurrence of color mixing.

A spacer SP is arranged at the position of the contact hole PCON. The spacer SP is arranged above the common electrode CTCO. The spacer SP can be arranged for all pixels, or a configuration in which the spacer is arranged only for the contact holes PCON of some pixels can be adopted.

A first light shielding layer LS1 is arranged on the first substrate SUB1. The first light shielding layer LS1 is arranged in the area of the pixel PX. FIG. 1 shows the first light shielding layers LS1a, LS1b as the first light shielding layer LS1. However, the first light shielding layer LS1 may be formed of only the first light shielding layer LS1a or only the first light shielding layer LS1b. The first light shielding layer LS1 is arranged at least in the region where the gate electrode GL1 and the semiconductor layer OS overlap. The light shielding layer LS1 prevents light incident from the first substrate SUB1 side from reaching the first semiconductor region OS1. When the light shielding layer LS1 is formed of a conductive layer, a voltage may be applied to the light shielding layer LS1. When a voltage is applied to the light shielding layer LS1, the light shielding layer LS1 and the gate electrode GL1 may be electrically connected.

1-2. Second Transistor Tr2

The driver circuit includes the second transistor Tr2 (p-channel transistor Tr2-1 and n-channel transistor Tr2-2). Both the p-channel transistor Tr2-1 and n-channel transistor Tr2-2 include the gate electrode GL2, gate insulating layer GI2, and semiconductor layer S. The semiconductor layer S includes a first semiconductor region S1, a second semiconductor region S2, and a third semiconductor region S3 (the third semiconductor region S3 is arranged only in the semiconductor layer S of the n-channel transistor Tr2-2).

In the semiconductor layer S, the first semiconductor region S1 corresponds to a region forming a channel, the second semiconductor region S2 corresponds to a region forming a source region and a drain region, and the third semiconductor region S3 corresponds to a region forming a low density drain (LDD). The gate electrode GL2 includes a region overlapping the first semiconductor region S1. The gate insulating layer GI2 is arranged between the semiconductor layer S and the gate electrode GL2.

FIG. 1 shows an example of the second transistor Tr2 as a bottom-gate type transistor, in which the gate electrode GL2 is arranged on the first substrate SUB1 side of the semiconductor layer S. The second transistor Tr2 may also be a top-gate transistor in which the positional relationship between the semiconductor layer S and the gate electrode GL2 is reversed.

The first insulating layer IL1 and the gate insulating layer GI1 are arranged on the semiconductor layer S. The gate insulating layer GI1 functions as an interlayer film for the p-channel type transistor Tr2-1 and the n-channel type transistor Tr2-2. The second wirings W2 are arranged on these insulating layers. The second wirings W2 are connected to the second semiconductor region S2 through openings in the first insulating layer IL1 and the gate insulating layer GI1. The second insulating layer IL2 is arranged above the second wirings W2. The first wirings W1 are arranged on the second insulating layer IL2. The first wirings W1 are connected to the second wirings W2 through openings arranged in the second insulating layer IL2.

The gate electrode GL2 and the first light shielding layer LS1b are the same layer. The second wirings W2 and the gate electrode GL1 are the same layer. Here, the same layer means that multiple components are formed by patterning one layer.

2. Partial Cross-Sectional Structure of Pixel

Figure 2:
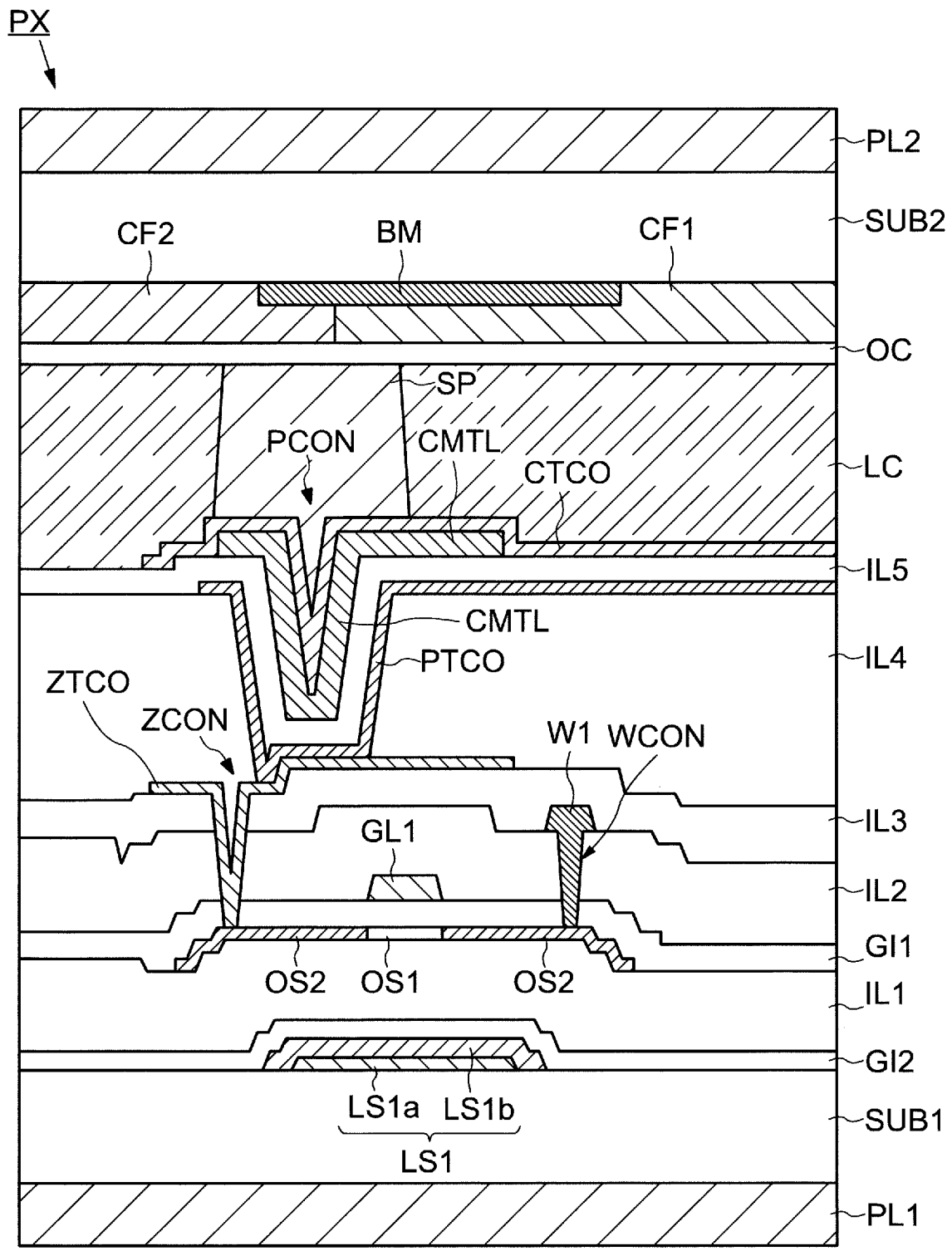
FIG. 2 is a cross-sectional view of a configuration of a pixel of a liquid crystal display device according to an embodiment of the present invention.

FIG. 2 shows an example of a partial cross-sectional structure of the pixel PX. The pixel PX includes the first substrate SUB1, the second substrate SUB2, and the liquid crystal layer LC between the first substrate SUB1 and the second substrate SUB2. As described in FIG. 1, the first substrate SUB1 includes the first light shielding layer LS1, the first transistor Tr1, the connecting electrode ZTCO, the pixel electrode PTCO, the common auxiliary electrode CMTL, and the common electrode CTCO. The second substrate SUB2 includes a second light shielding layer BM, color filter layers (first color filter layer CF1, second color filter layer CF2), and an overcoat layer OC. The distance (cell gap) between the first substrate SUB1 and the second substrate SUB2 is kept constant by the spacer SP.

The second light shielding layer BM is formed, for example, of an organic resin material containing black pigment. The second light shielding layer BM is arranged in the boundary region of the pixel PX. The second light shielding layer BM is arranged in the boundary region between the first color filter layer CF1 and the second color filter layer CF2. The first color filter layer CF1 and the second color filter layer CF2 are colored in a predetermined color and have translucent properties, and are colored in different hues. The overcoat layer OC is arranged on the first color filter layer CF1 and the second color filter layer CF2. FIG. 2 shows the alignment film that defines the initial alignment state of the liquid crystal layer LC, which is omitted.

A first polarizing plate PL1 is arranged on the first substrate SUB1 and a second polarizing plate PL2 is arranged on the second substrate SUB2. The first polarizing plate PL1 and the second polarizing plate PL2 are linear polarizing plates, arranged with their polarization axes orthogonal to each other (cross Nicole).

As shown in FIG. 2, the liquid crystal display 100A is a transmissive liquid crystal display in which the liquid crystal layer LC is arranged between the first substrate SUB1 and the second substrate SUB2, and the alignment state of the liquid crystal layer LC is controlled by the pixel electrode PTCO and the common electrode CTCO. The driving method for the liquid crystal is the FFS (Fringe Field Switching) method with a slit in the common electrode CTCO, as shown in the next section.

3. Planar Layout of Pixels

Figure 3:
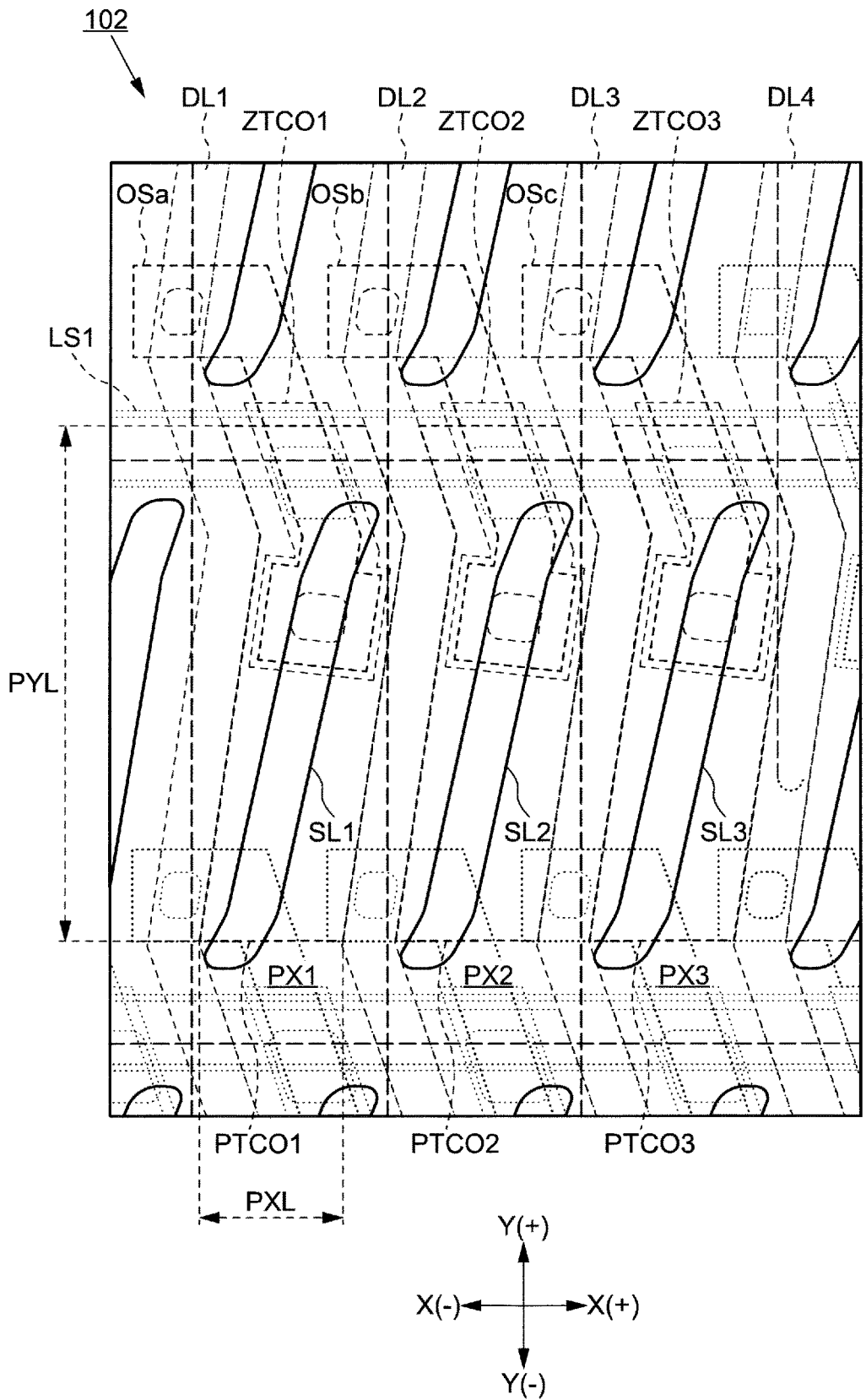
FIG. 3 is a plan view of a configuration of a pixel region of a liquid crystal display device according to an embodiment of the present invention.

FIG. 3 shows a partial plan view of a pixel region 102, showing a first pixel PX1, a second pixel PX2, and a third pixel PX3. For example, the first pixel PX1 is a pixel corresponding to blue, the second pixel PX2 is a pixel corresponding to green, and the third pixel PX3 is a pixel corresponding to red.

FIG. 3 shows the X and Y axes for illustration, the direction parallel to the X-axis shall be described as the direction along the X-axis or X-axis direction, and the direction parallel to the Y-axis shall be described as the direction along the Y-axis or Y-axis direction. The X-axis direction may be read as the first direction and the Y-axis direction as the second direction that intersects the first direction.

FIG. 3 shows an arrangement of the first pixel PX1, the second pixel PX2, and the third pixel PX3 along a direction along the X-axis. The pixel region 102 has a configuration of a set of first and third pixels arranged in a direction along the X-axis and a direction along the Y-axis.

The first pixel PX1 includes a first semiconductor layer OSa, a first connecting electrode ZTCO1, and a first pixel electrode PTCO1, the second pixel PX2 includes a second semiconductor layer OSb, a second connecting electrode ZTCO2, and a second pixel electrode PTCO2, and the third pixel PX3 includes a third semiconductor layer OSc, a third connecting electrode ZTCO3, and a third pixel electrode PTCO3. The first pixel PX1, the second pixel PX2, and the third pixel PX3 include the common electrode CTCO. The common electrode CTCO overlaps the first pixel electrode PTCO1, the second pixel electrode PTCO2, and the third pixel electrode PTCO3 in a plan view. The common electrode CTCO is an electrode shared by the first pixel PX1, the second pixel PX2, and the third pixel PX3, and has a size that extends over the entire pixel region 102.

The first pixel electrode PTCO1 is not rectangular but has a bent shape, and it has a shape in which a length PYL along the Y-axis direction is longer than a length PXL along the X-axis direction. The same is true for the second pixel electrode PTCO2 and the third pixel electrode PTCO3.

The common electrode CTCO has a first slit SL1, a second slit SL2, and a third slit SL3. The first slit SL1 overlaps the first pixel electrode PTCO1, the second slit SL2 overlaps the second pixel electrode PTCO2, and the third slit SL3 overlaps the third pixel electrode PTCO3. In other words, the first slit SL1 is arranged between the first data signal line DL1 and the second data signal line DL2, the second slit SL2 is arranged between the second data signal line DL2 and the third data signal line DL3, and the third slit SL3 is arranged between the third data signal line DL3 and the fourth data signal line DL4.

The liquid crystal display 100A is driven in FFS mode. Under the FFS mode, the alignment direction of the liquid crystal molecules in the liquid crystal layer LC is controlled by the fringe electric field generated between the pixel electrode PTCO and the common electrode CTCO. Although not shown in FIG. 1 and FIG. 2, the liquid crystal display 100A includes a backlight, and an image is displayed by controlling the light from the backlight according to the alignment state of the liquid crystal layer LC.

The pixel region 102 is arranged with the scanning signal lines SCL (first scanning signal line SCL1, second scanning signal line SCL2) that extend in the X-axis direction and the data signal lines DL (first data signal line DL1, second data signal line DL2, third data signal line DL3, fourth data signal line DL4) that extend in the Y-axis direction.

4. Detailed Layout of Each Layer Configuring Pixel Region

The following is a detailed layout of each layer configuring the pixel region 102.

4-1. First Light Shielding Layer and Semiconductor Layer

Figure 4:
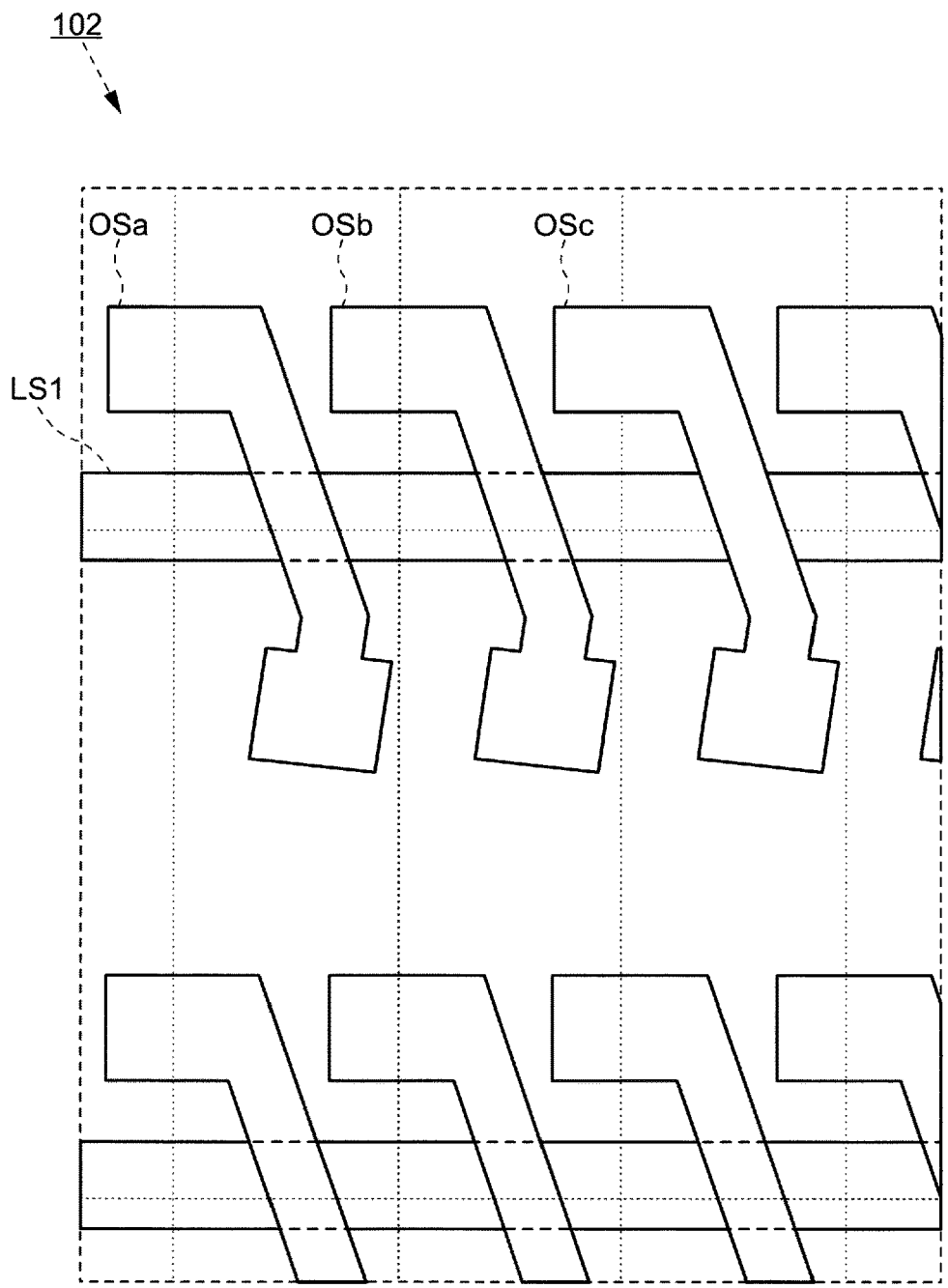
FIG. 4 is a plan view of a configuration of a light shielding layer and a semiconductor layer in a pixel region of a liquid crystal display device according to an embodiment of the present invention.

FIG. 4 shows the first light shielding layer LS1, the first semiconductor layer OSa, the second semiconductor layer OSb, and the third semiconductor layer OSc. The first light shielding layer LS1 has a pattern extending in the X-axis direction. The first semiconductor layer OSa, the second semiconductor layer OSb, and the third semiconductor layer OSc have an island-like pattern that is bent into an island shape and extends in the Y-axis direction. The first semiconductor layer OSa, the second semiconductor layer OSb, and the third semiconductor layer OSc intersect the first light shielding layer LS1 and are arranged in the X-axis direction. The first semiconductor layer OSa, the second semiconductor layer OSb, and the third semiconductor layer OSc are arranged on the upper side of the first light shielding layer LS1.

4-2. Scanning Signal Line and Data Signal Line

Figure 5:
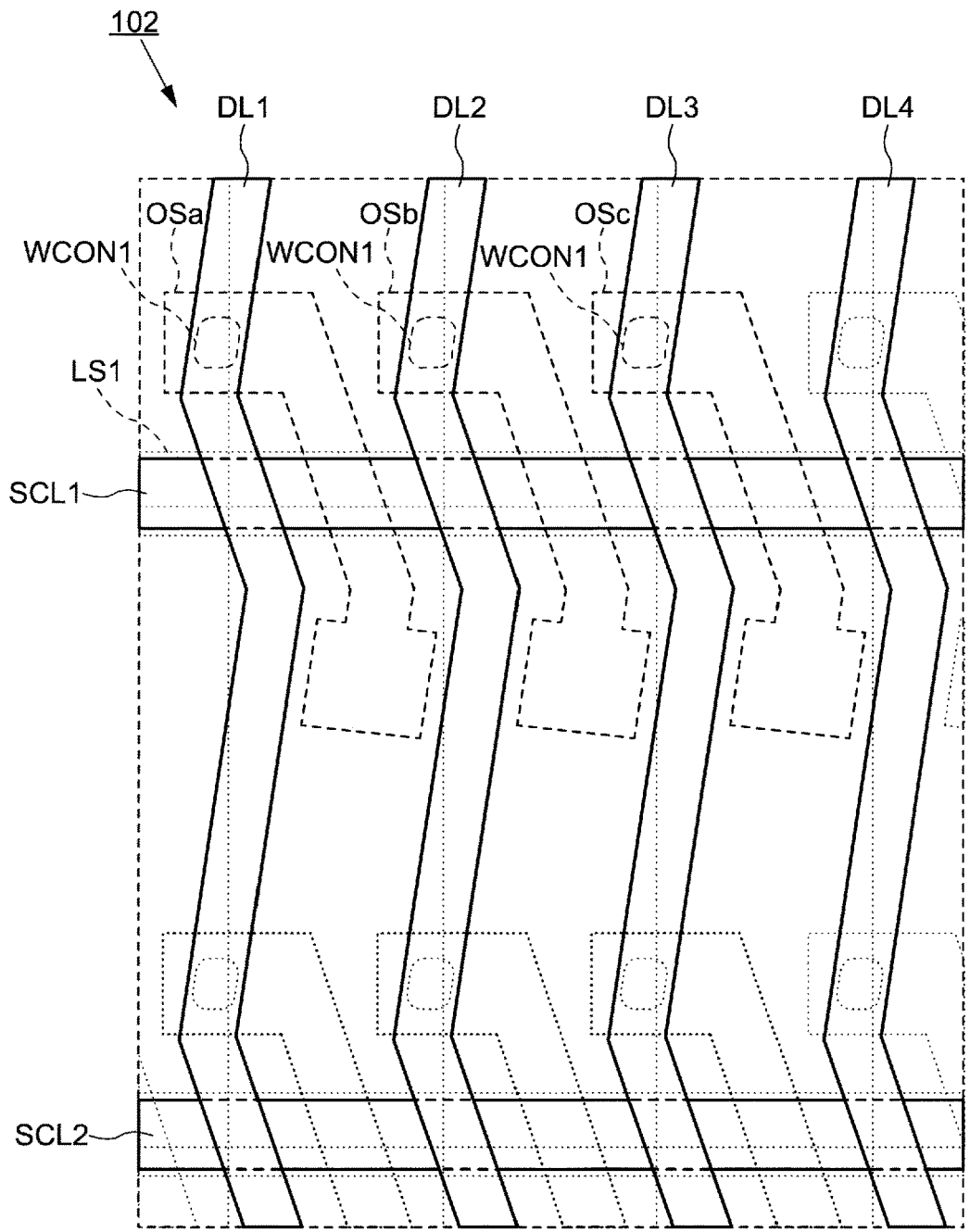
FIG. 5 is a plan view of a configuration of scanning signal lines and data signal lines in a pixel region of a liquid crystal display device according to an embodiment of the present invention.

FIG. 5 shows the scanning signal lines SCL (first scanning signal line SCL1, second scanning signal line SCL2) and data signal lines DL (first data signal line DL1, second data signal line DL2, third data signal line DL3, fourth data signal line DL4). The first scanning signal line SCL1 extends in the X-axis direction to intersect the first semiconductor layer OSa, the second semiconductor layer OSb, and the third semiconductor layer OSc.

In this embodiment, the first semiconductor layer OSa, the second semiconductor layer OSb, and the third semiconductor layer OSc intersect the first scanning signal line SCL1 in a diagonal direction, but a configuration where they are orthogonal can also be adopted. The second scanning signal line SCL2 is arranged at a distance of one pixel in the Y-axis direction from the first scanning signal line SCL1. The portions where the first scanning signal line SCL1 intersects the first semiconductor layer OSa, the second semiconductor layer OSb, and the third semiconductor layer OSc function as gate electrodes (corresponding to "GL1" shown in FIG. 1). The first scanning signal line SCL1 (gate electrode GL1) is arranged inside the pattern of the first light shielding layer LS1 and overlaps with the first light shielding layer over its length direction.

The first data signal line DL1, the second data signal line DL2, the third data signal line DL3, and the fourth data signal line DL4 extend in the Y-axis direction and intersect the first scanning signal line SCL1 and the second scanning signal line SCL2. As shown in FIG. 1, the gate insulating layer GI1 and the second insulating layer IL2 are arranged between the first scanning signal line SCL1 and the data signal lines DL. The contact holes WCON1, WCON2, WCON3 are arranged in the region overlapping the first data signal line DL1, the second data signal line DL2, and the third data signal line DL3 near one end of the island-shaped patterns of the first semiconductor layer OSa, the second semiconductor layer OSb, and the third semiconductor layer OSc, respectively.

A portion of the first semiconductor layer OSa is arranged between the first data signal line DL1 and the second data signal line DL2 and extends in the Y-axis direction. One end of the first semiconductor layer OSa has a pattern that bends in the direction of the contact hole WCON1 from the portion sandwiched between the first data signal line DL1 and the second data signal line DL2. The first semiconductor layer OSa is connected to the first data signal line DL1 at the contact hole WCON1. The same is true for the second semiconductor layer OSb and the third semiconductor layer OSc.

4-3. Connecting Electrode and Pixel Electrode

Figure 6:
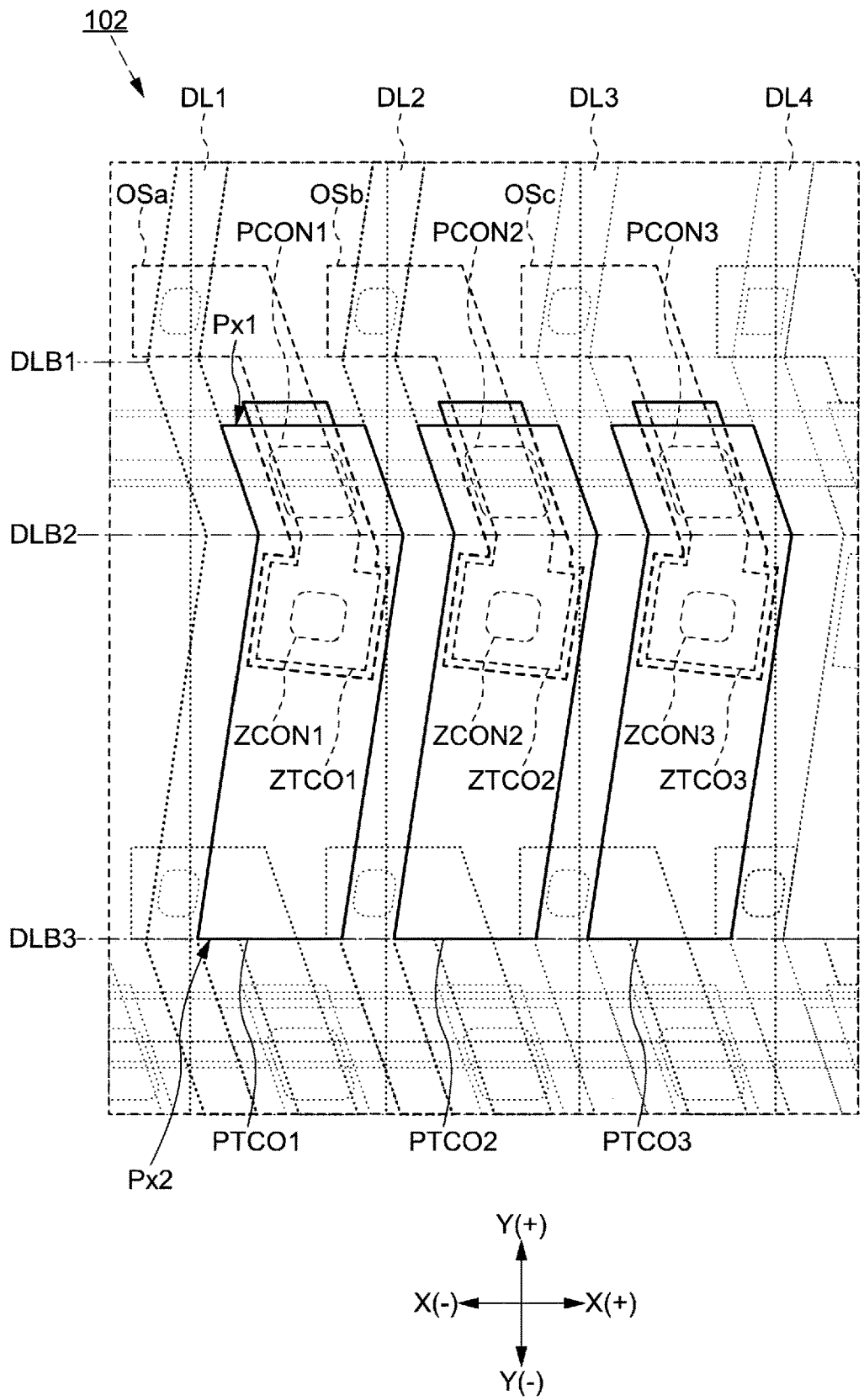
FIG. 6 is a plan view of a configuration of connecting electrodes and pixel electrodes in a pixel region of a liquid crystal display device according to an embodiment of the present invention.

As shown in FIG. 6, the contact holes ZCON1, ZCON2, ZCON3 overlap the island-shaped patterns of the first semiconductor layer OSa, the second semiconductor layer OSb, and the third semiconductor layer OSc, respectively. The contact holes WCON1, WCON2, WCON3 are arranged on a side of a first edge of each of the first semiconductor layer OSa, the second semiconductor layer OSb, and the third semiconductor layer OSc. In contrast, the contact holes ZCON1, ZCON2, ZCON3 are arranged on a side of a second edge of each of the first semiconductor layer OSa, the second semiconductor layer OSb, and the third semiconductor layer OSc.

The first connecting electrode ZTCO1 is arranged between the first data signal line DL1 and the second data signal line DL2 and overlaps the first semiconductor layer OSa. The first connecting electrode ZTCO1 is connected to the first semiconductor layer OSa at the contact hole ZCON1. The first connecting electrode ZTCO1 extends in the Y-axis direction and extends to the region beyond the first scanning signal line SCL1. Similarly, the second semiconductor layer OSb is connected to the second connecting electrode ZTCO2 and the third semiconductor layer OSc is connected to the third connecting electrode ZTCO3.

As shown in FIG. 6, the first pixel electrode PTCO1 is connected to the first connecting electrode ZTCO1 by the contact hole PCON1. The contact hole PCON1 is arranged in an area overlapping the pattern of the first scanning signal line SCL1 (gate electrode GL1) at a position slightly separated from the contact hole ZCON1 toward the first data signal line DL1. The same is true for the contact hole PCON2 connecting the second pixel electrode PTCO2 to the second connecting electrode ZTCO2 and the contact hole PCON3 connecting the third pixel electrode PTCO3 to the third connecting electrode ZTCO3.

The first pixel electrode PTCO1 has a bent shape between the first data signal line DL1 and the second data signal line DL2, overlaps the scanning signal line SCL (gate electrode GL1), the semiconductor layer OS1a, and the first connecting electrode ZTCO1, and extends in the Y-axis direction. Specifically, the first pixel electrode PTCO1 is bent at a position adjacent to a bent portion DLB2 of the first data signal line DL1 and the second data signal line DL2, and extends along the Y-axis direction between the first data signal line DL1 and the second data signal line DL2.

The first pixel electrode PTCO1 extends beyond the bent portion DLB2 in the positive direction of the Y-axis (Y(+) direction) and has an area overlapping the contact hole PCON1. A first edge Px1 of the first pixel electrode PTCO1 is located beyond the contact hole PCON1. The first pixel electrode PTCO1 extends from the bent portion DLB2 along the negative direction of the Y-axis (Y(−) direction). The second edge Px2 of the first pixel electrode PTCO1 is located adjacent to or near a second bent portion DLB3 of the first data signal line DL1 and the second data signal line DL2. The same is true for the second pixel electrode PTCO2 and the third pixel electrode PTCO3.

4-4. Common Auxiliary Electrode

Figure 7:
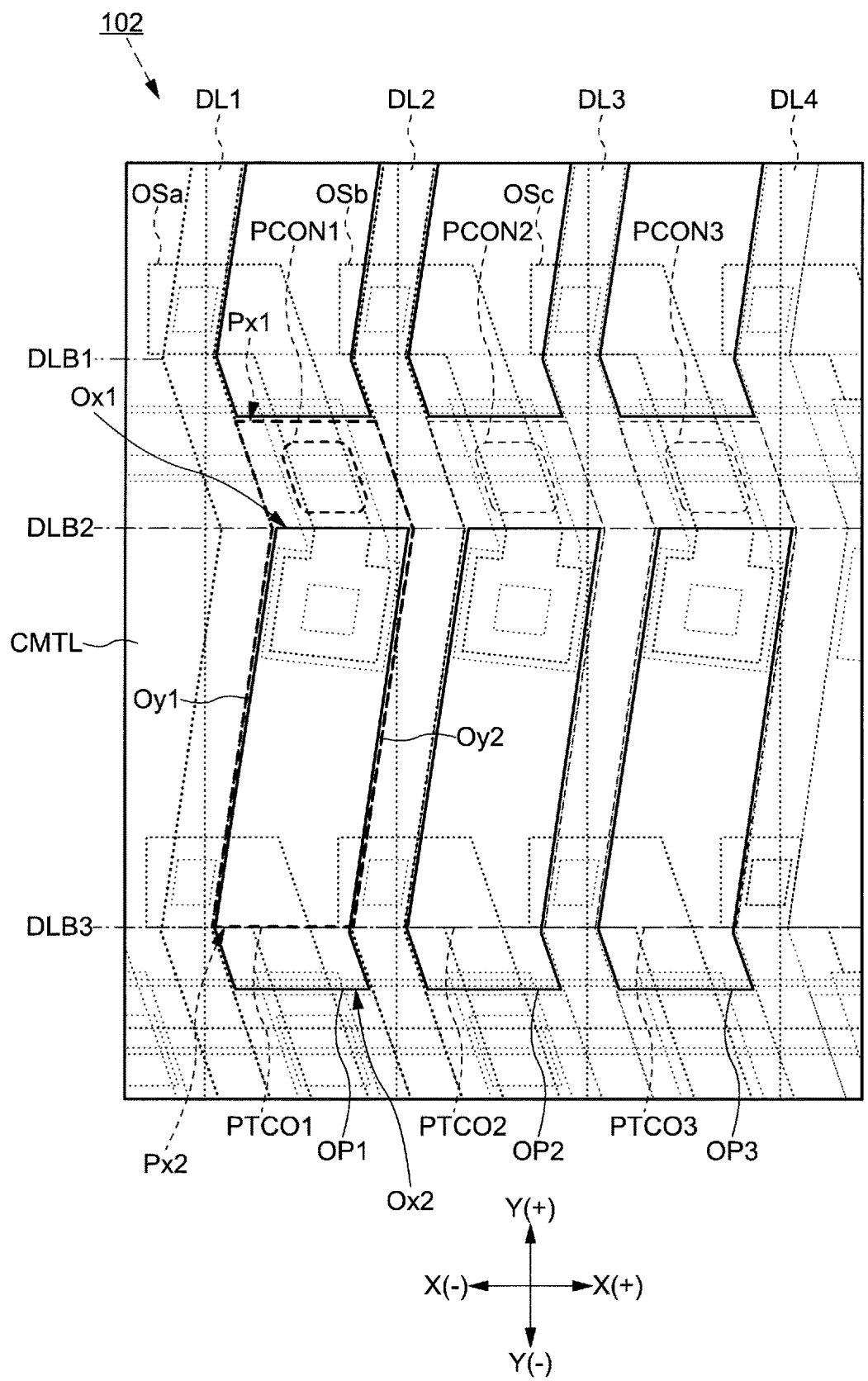
FIG. 7 is a plan view of the configuration of a common auxiliary electrode in a pixel region of a liquid crystal display device according to an embodiment of the present invention.

FIG. 7 shows the common auxiliary electrode CMTL. The common auxiliary electrode CMTL includes a first opening OP1, a second opening OP2, and a third opening OP3. The first opening OP1 partially overlaps the first pixel electrode PTCO1 and is arranged in the region between the first data signal line DL1 and the second data signal line DL2. The opening edges Oy1, Oy2 extending in the Y-axis direction of the first opening OP1 are arranged along the first data signal line DL1 and the second data signal line DL2. The opening edges Oy1, Oy2 extending in the Y-axis direction of the first opening OP1 may overlap the edges of the first data signal line DL1 and the second data signal line DL2, or may be located inside or outside of these edges.

The first opening OP1 extends along the first data signal line DL1 and the second data signal line DL2 in the Y-axis direction and has a bent shape like a fold. Specifically, the first opening OP1 is bent at the bent portion DLB3 of the first data signal line DL1 and the second data signal line DL2, and extends along the Y-axis direction between the first data signal line DL1 and the second data signal line DL2. The first opening OP1 extends beyond the bent portion DLB3 along the plus direction (Y(+) direction) of the Y-axis. The first opening edge Ox1 of the first opening OP1 is located adjacent to or near the bent portion DLB2 of the first data signal line DL1 and the second data signal line DL2. The first opening edge Ox1 of the first opening OP1 is located in front of the contact hole PCON1, and the first opening OP1 does not overlap the contact hole PCON1. The first opening OP1 extends from the second bent portion DLB3 along the negative direction of the Y-axis (Y(−) direction). The second opening edge Ox2 of the first opening OP1 is located outside the second edge of the first pixel electrode PTCO1. The same is true for the second opening OP2 arranged corresponding to the second pixel electrode PTCO2 and the third opening OP3 arranged corresponding to the third pixel electrode PTCO3.

Thus, the first pixel electrode PTCO1 and the first opening OP1 do not entirely overlap, but are arranged so that the edges along the Y-axis direction are mutually displaced. In other words, the first opening OP1 is arranged so that it does not overlap the region where the first pixel electrode PTCO1 overlaps the contact hole PCON1, so that the effect of alignment disorder of the liquid crystal formed by the step of the contact hole is not affected. The same is true for the relationship between the second pixel electrode PTCO2 and the second opening OP2, and the third pixel electrode PTCO3 and the third opening OP3.

The common auxiliary electrode CMTL is formed by a metal film and has a size that extends over the entire pixel region 102. Therefore, the region with openings OP (first opening OP1, second opening OP2, and third opening OP3, as shown in FIG. 7) is the transparent region of the pixel region 102, and the other regions are non-transparent regions. Therefore, the common auxiliary electrode CMTL functions as a light shielding layer. The common auxiliary electrode CMTL is used as an auxiliary electrode to reduce the resistance of the common electrode CTCO formed on the entire surface of the pixel region 102 with a transparent conductive film.

According to the above configuration, the amount of light emitted from the first pixel PX1, the second pixel PX2, and the third pixel PX3 is adjusted by adjusting the size of the first opening OP1, the second opening OP2, and the third opening OP3 of the common auxiliary electrode CMTL.

4-5. Common Electrode

Figure 8:
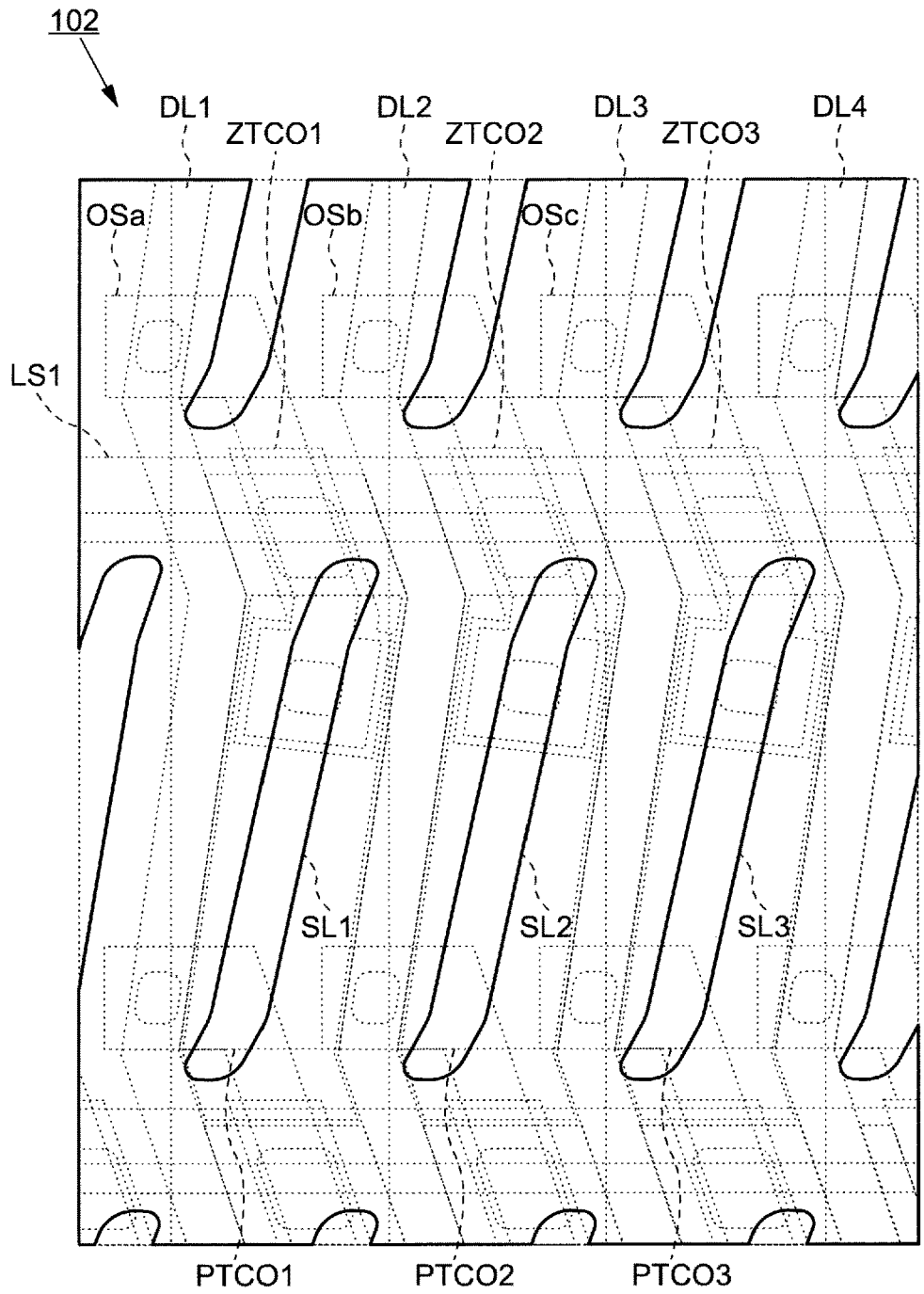
FIG. 8 is a plan view of the configuration of a common electrode in a pixel region of a liquid crystal display device according to an embodiment of the present invention.

FIG. 8 shows the common electrode CTCO. The common electrode CTCO is commonly arranged for the plurality of pixels and overlaps with the first pixel electrode PTCO1, the second pixel electrode PTCO2, and the third pixel electrode PTCO3. The common electrode CTCO is arranged with the first slit SL1 in the region overlapping the first pixel electrode PTCO1 in a plan view. The first slit SL1 also overlaps with the first opening OP1. The common electrode CTCO is formed by a transparent conductive film, and the first slit SL1 is formed by removal of the transparent conductive film. The second slit SL2 and the third slit SL3 are arranged for the second pixel electrode PTCO2 and the third pixel electrode PTCO3 in the same manner.

4-6. Materials of Each Component Configuring the Pixels

A rigid substrate such as glass, a quartz substrate, and a sapphire substrate that are translucent and not flexible may be used as the first substrate SUB1 and the second substrate SUB2. The first substrate SUB1 and the second substrate SUB2 may be flexible substrates. The substrate materials such as polyimide, acrylic, siloxane, or fluoropolymer substrates can be used for the flexible substrates. Impurities may be introduced into the above resins to improve the heat resistance of the first substrate SUB1 and the second substrate SUB2.

Metallic materials can be used as the scanning signal line SCL (gate electrode GL1), the gate electrode GL2, the data signal line DL, the first wirings W1, the second wirings W2, the first light shielding layer LS1, and the common auxiliary electrode CMTL. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), and alloys or compounds thereof are used. The above materials may be used in a single layer or in a laminate as the above components.

Insulating materials can be used as the gate insulating layers GI1, GI2 and the first insulating layer IL1, the second insulating layer IL2, the third insulating layer IL3, the fourth insulating layer IL4, and the fifth insulating layer IL5. For example, inorganic materials such as silicon oxide ($SiO_x$), silicon nitride oxide ($SiO_xN_y$), silicon nitride ($Si_xN_y$), aluminum oxide ($AlO_x$), aluminum nitride oxide ($AlO_xN_y$), aluminum nitride ($AlN_x$), and the like can be used as the first insulating layer IL1, the second insulating layer IL2, the third insulating layer IL3 and the fifth insulating layer IL5. As these insulating layers, it is preferable to use insulating layers with few defects. Organic insulating materials such as polyimide resin, acrylic resin, epoxy resin, silicone resin, fluorine resin, or siloxane resin can be used as the fourth insulating layer IL4. The above organic insulating materials may be used as the gate insulating layers GI1, GI2 and the first insulating layer IL1, the second insulating layer IL2, the third insulating layer IL3, and the fifth insulating layer IL5. The above materials may be used as the above components in a single layer or in a stack.

As an example of an insulating layer, $SiO_x$ with a thickness of 100 nm is used as the gate insulating layer GI1. $SiO_x/Si_xN_y/SiO_x$ with a total thickness of 600 nm to 700 nm is used as the first insulating layer IL1. $SiO_x/Si_xN_y$ with a total thickness of 60 to 100 nm is used as the gate insulating layer GI2. $SiO_x/Si_xN_y/SiO_x$ with a total thickness of 300 nm to 500 nm is used as the second insulating layer IL2. $SiO_x$ (single layer), $Si_xN_y$ (single layer), or a laminate of these with a total thickness of 200 nm to 500 nm are used as the third insulating layer IL3. An organic layer with a thickness of 2 μm to 4 μm is used as the fourth insulating layer IL4. $Si_xN_y$ (single layer) with a thickness of 50 nm to 150 nm is used as the fifth insulating layer IL5.

A metal oxide (oxide semiconductor) with semiconductor properties can be used as the semiconductor layer OS. The semiconductor layer OS has translucent properties. For example, an oxide semiconductor containing indium (In), gallium (Ga), zinc (Zn), and oxygen (O) can be used. In particular, an oxide semiconductor having a composition ratio of In:Ga:Zn:O=1:1:1:4 can be used. However, the oxide semiconductor containing In, Ga, Zn, and O used in this embodiment is not limited to the above composition, and an oxide semiconductor with a composition different from the above can also be used. For example, the ratio of In may be larger than the above to improve mobility. The ratio of Ga may be larger than the above to increase the band gap and reduce the effect of light irradiation.

Other elements may be added to the oxide semiconductor containing In, Ga, Zn, and O. For example, metallic elements such as Al and Sn may be added to said oxide semiconductors. In addition to the above oxide semiconductors, oxide semiconductors including In and Ga (IGO), oxide semiconductors including In and Zn (IZO), oxide semiconductors including In, Sn and Zn (ITZO), and oxide semiconductors including In and W may be used as the semiconductor layer OS. The semiconductor layer OS may be amorphous or crystalline. The semiconductor layer OS may be a mixture of amorphous and crystalline phases.

A transparent conductive layer is used as the connecting electrode ZTCO, the pixel electrodes PTCO (first pixel electrode PTCO1, second pixel electrode PTCO2, and third pixel electrode PTCO3), and the common electrode CTCO. A compound of indium oxide and tin oxide (ITO) and a compound of indium oxide and zinc oxide (IZO) can be used as said transparent conductive layers. Materials other than the above may be used as said transparent conductive layers.

5. Detailed Pixel Structure

Figure 9:
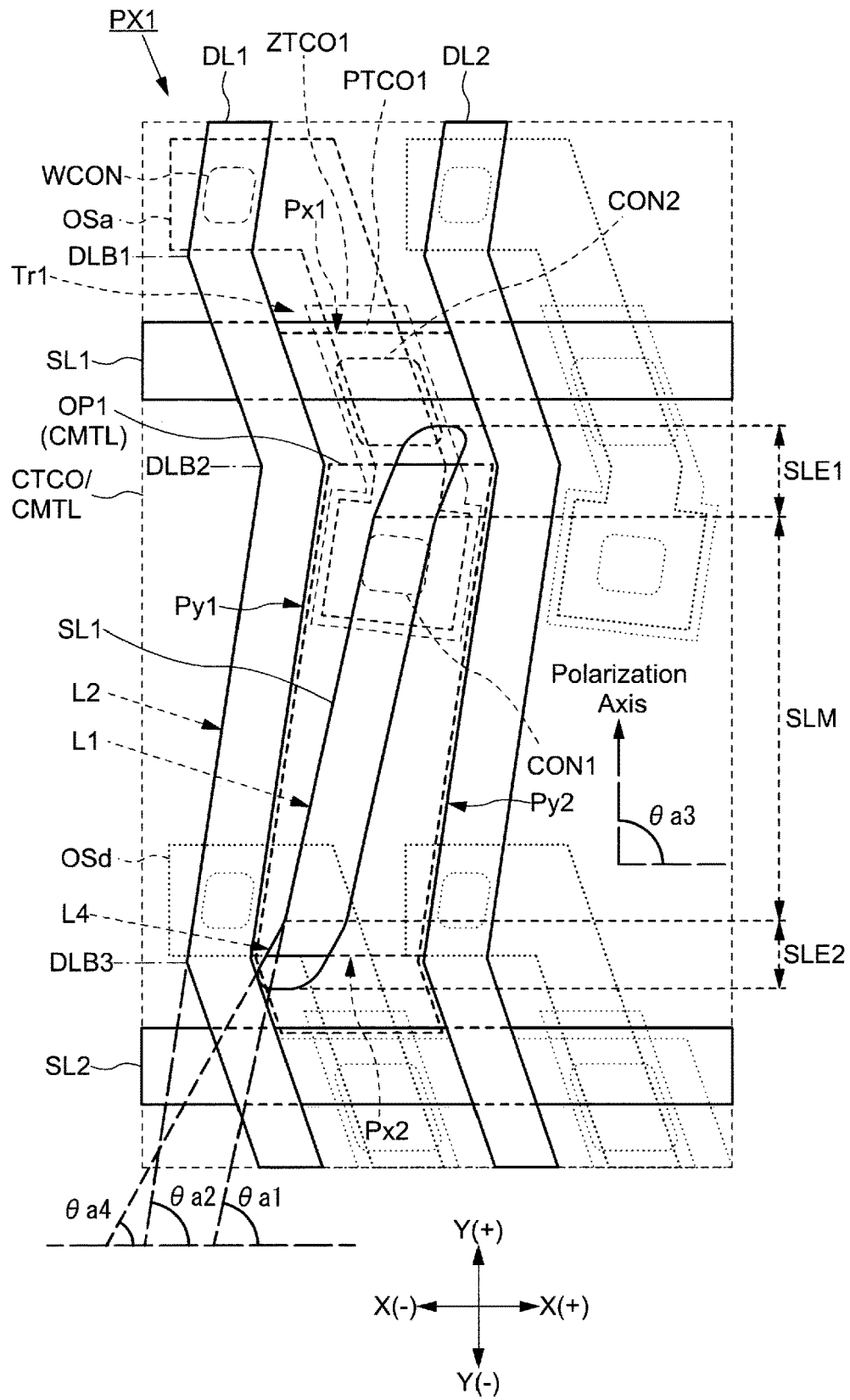
FIG. 9 is a plan view of a detailed configuration of a pixel of a liquid crystal display device according to an embodiment of the present invention.

FIG. 9 shows a plan view of the first pixel PX1. The first data signal line DL1 extends in the Y-axis direction while bending in the plus and minus directions of the X-axis. Looking at the first data signal line DL1 from the plus direction of the Y-axis to the minus direction, the first data signal line DL1 intersects the first semiconductor layer OSa, then bends in the plus direction of the X-axis at the bent portion DLB1 and intersects the first scanning signal line SCL1 at an angle. After crossing the first scanning signal line SCL1, the first data signal line DL1 bends in the minus direction of the X-axis at the bent portion DLB2, extends in the Y-axis direction, and intersects the fourth semiconductor layer OSd. The first data signal line DL1 bends again in the plus direction of the X-axis at the bent portion DLB3 and intersects the second scanning signal line SCL2 at an angle. The first data signal line DL1 extends in the Y-axis direction with such a periodic bending pattern. Such a bending wiring pattern is the same for the second data signal line DL2 and other data signal lines DL.

The first pixel electrode PTCO1 is arranged to extend in the Y-axis direction from the region overlapping the first scanning signal line SCL1. The sides Py1 and Py2 of the first pixel electrode PTCO1 extending in the Y-axis direction are bent in accordance with the bending patterns of the first data signal line DL1 and the second data signal line DL2. The first data signal line DL1 and the second data signal line DL2 are formed of a metal film and have light-shielding properties. The first data signal line DL1 and the second data signal line DL2 have a function as a light-shielding layer for the first pixel electrode PTCO1, in addition to their function as wiring for transmitting signals.

The common auxiliary electrode CMTL shields the region where the contact hole PCON is formed. The first opening OP1 is a light-transmitting region and is arranged so that it overlaps the region of the first pixel electrode PTCO1 other than the contact region. The first opening OP1 also has a shape that bends in accordance with the bending patterns of the first data signal line DL1 and the second data signal line DL2. Thus, the common auxiliary electrode CMTL has a function as a light-shielding layer for the first pixel electrode PTCO1, in addition to its function as an auxiliary electrode for lowering the resistance of the common electrode CTCO.

The first slit SL1 on the common electrode CTCO is arranged between the first data signal line DL1 and the second data signal line DL2. The first slit SL1 is a region where the transparent conductive film forming the common electrode CTCO is removed in an elongated manner. FIG. 9 shows the shape of the first slit SL1, which is divided into a plurality of portions and each portion is indicated with a code to illustrate the shape of the first slit SL1. Specifically, FIG. 9 shows the first slit SL1 divided into the slit center portion SLM and the slit end portions SLE1, SLE2 located on both sides of the slit. The slit center portion SLM is the major portion of the first slit SL1. The slit center portion SLM overlaps the first pixel electrode PTCO1 and the first opening OP1. The slit end portion SLE1 is the portion on the first scanning signal line SCL1 side continuous from the slit center portion SLM, and the slit end portion SLE2 is the portion on the second scanning signal line SCL2 side continuous from the slit center portion SLM.

The slit center portion SLM is an elongated rectangular pattern extending in the Y-axis direction, but inclined in the X-axis direction rather than parallel to the Y-axis direction. In other words, the slit center portion SLM is inclined in correspondence with the inclination of the first data signal line DL1. The angle of inclination of the slit center portion SLM with respect to the X-axis and the angle at which the first data signal line DL1 is inclined are different. For example, when one side of the slit center portion SLM is L1 and one side of the first data signal line DL1 adjacent thereto is L2, the first angle θa1 formed by the side L1 with respect to the X-axis and the second angle θa2 formed by the side L2 with respect to the X-axis are different. Specifically, the first angle θa1 and the second angle θa2 differ in a range of 1 degree to 5 degrees, preferably 1 degree to 3 degrees. FIG. 9 shows a case where the first angle θa1 is smaller than the second angle θa2 in the above range, but the first angle θa1 may be larger than the second angle θa2 in the above range.

Thus, the distance in the X-axis direction between the data signal line or opening and the slit concerned will vary over the Y-axis direction, by tilting the slit with respect to the first data signal line DL1 extending in the Y-axis direction or the opening end of the first opening OP1. More specifically, as seen in FIG. 9, the distance between the opening end of the first opening OP1 or first data signal line DL1 and the slit gradually decreases toward the second bent portion DLB2 of the first data signal line DL1 to the third bent portion DLB3.

It is possible to prevent periodic shading (stripe patterns) from occurring at the pixel level when displaying an image on the screen of the liquid crystal display device 100A, by making the first angle θa1 and the second angle θa2 differ in a range from 1 degree to 5 degrees, preferably from 1 degree to 3 degrees. It is undesirable if the difference between the first angle θa1 and the second angle θa2 exceeds 5 degrees because it may result in the inability to accurately represent the colors of the displayed image. It is undesirable if the angle difference is smaller than 1 degree because the effect described above may not be sufficiently obtained.

The slit end portions SLE1, SLE2 of the first slit SL1 are inclined at different angles from the slit center portion SLM.

For example, as shown in FIG. 9, the angle that the side L4 makes with the X-axis is expressed as θa4, when one side of the slit end SLE2 is L4. The fourth angle θa4 is smaller than the first angle θa1. The slit end portion SLE2 is inclined in the direction of the first data signal line DL1 from the slit center portion SLM, as is evident from the relationship between the first angle θa1 and the fourth angle θa4. The slit end portion SLE1 is an inverted shape of the slit end portion SLE2 and is inclined in the direction of the second data signal line DL2.

The first angle θa1 of the slit center SLM is preferred to be different from the polarizing axis of the polarizing plate. When the angle θa3 is the angle at which the polarization axis of the polarizing plate intersects the X-axis, the first angle θa1 and the second angle θa2 and the angle θa3 of the polarization axis are preferably different angles. The first angle θa1 of the slit center portion SLM is preferably inclined in the range of 10±5 degrees with respect to the polarization axis. This arrangement can also prevent periodic shading (stripe patterns) from being visible when the image displayed on the screen of the liquid crystal display device 100A is magnified through the lens.

One side of the first opening OP1 of the common auxiliary electrode CMTL along the first data signal line DL1 is inclined at the same angle as the second angle θa2 to the X-axis. Since the first opening OP1 functions as a light-shielding layer, the same explanation as above can be made by replacing the angle of one side of the first opening OP1 with the second angle θa2 of the first data signal line DL1.

FIG. 9 shows the first pixel PX1, and the relationship between the angle θa1 of the slit SL and the second angle θa2 of the data signal line DL is the same for other pixels in the pixel region 102.

As presented in this embodiment, it is possible to prevent periodic shading (stripe patterns) from being visible when the image displayed on the screen of the display device 100A is magnified through the lens by varying the angle of the data signal line that serves as a light-shielding layer with respect to the angle of the slit in the pixel.

6. Configuration of Liquid Crystal Display

Figure 10:
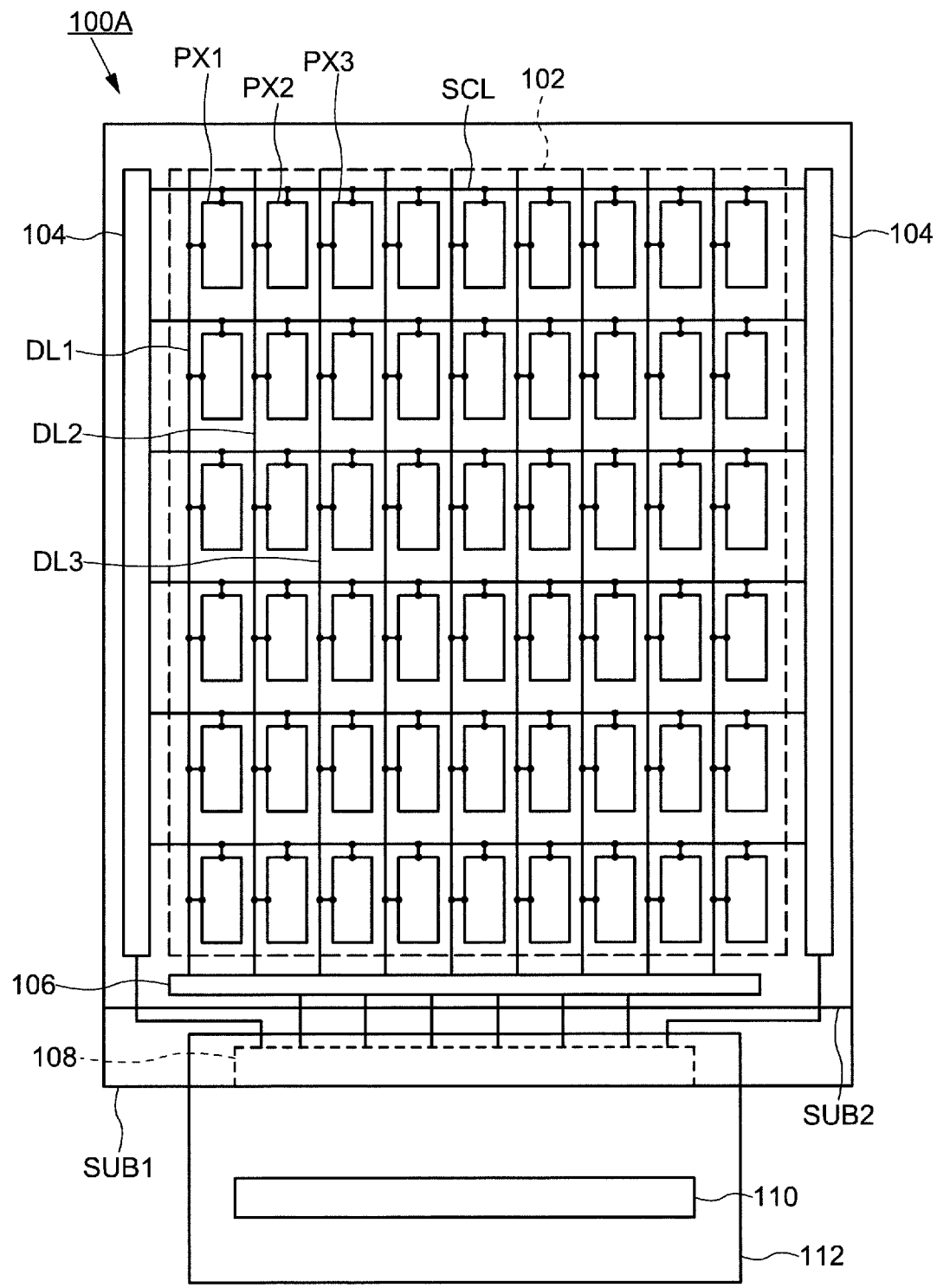
FIG. 10 is a configuration of a liquid crystal display device according to an embodiment of the present invention.

FIG. 10 shows the configuration of the LCD display device 100A according to an embodiment of the present invention. The liquid crystal display device 100A includes the first substrate SUB1, the second substrate SUB2, a driver IC 110, and a flexible printed circuit board 112. A sealant, not shown, is arranged between the first substrate SUB1 and the second substrate SUB2. The first substrate SUB1 and the second substrate SUB2 are laminated together by the seal material.

The first substrate SUB1 includes the pixel region 102 in which the plurality of pixels PX are arranged, the scanning signal line driver circuit 104, the data signal line selection circuit 106, and a terminal part 108 that forms a connection with a flexible printed circuit board 112, which is arranged in a region outside of the pixel region 102. The driver IC 110 is mounted on the flexible printed circuit board 112. The pixel region 102 includes the first pixel PX1, the second pixel PX2, and the third pixel PX3. The scanning signal lines SCL are connected to the scanning signal line driver circuit 104, and the first data signal line DL1, the second data signal line DL2, and the third data signal line DL3 are connected to the data signal line selector circuit 106.

The first transistor Tr shown in FIG. 1 is arranged for the first pixel PX1, the second pixel PX2, and the third pixel PX3, respectively. The second transistor Tr2 is arranged for the scanning signal line driver circuit 104 and the data signal line selector circuit 106. The first pixel PX1, the second pixel PX2, and the third pixel PX3 shown in FIG. 3 form the pixel region 102.

According to this embodiment, the distance between the slit SL and the edge of the data signal line DL or the opening OP gradually changes along the Y-axis direction by tilting the slit SL with respect to the edge of the data signal line DL or the opening OP along the data signal line DL. This configuration provides subtle changes in the distribution of the electric field and the alignment state of the liquid crystal molecules when a potential difference is arranged between the common electrode CTCO and the pixel electrode PTCO. In the image displayed on the screen of the liquid crystal display 100A, it is possible to prevent the periodic shading (stripe pattern) that may occur at each pixel PX in the image displayed on the screen of the liquid crystal display device 100A. As a result, even if a user views the display screen through a lens or the like, the stripe pattern can be prevented from being visible. According to the liquid crystal display device in this embodiment, it is possible to achieve high definition in applications such as VR goggles and to improve image quality even when the image is viewed under magnification through a lens.

Second Embodiment

A configuration of a liquid crystal display device according to the second embodiment of the present invention is described with reference to FIG. 11 and FIG. 12. For this embodiment of the liquid crystal display device, a configuration of pixel electrodes and common electrodes differs from that of the first embodiment. The configuration of the liquid crystal display device according to this embodiment will be described below, focusing on the portions that are different from those of the first embodiment.

Figure 11:
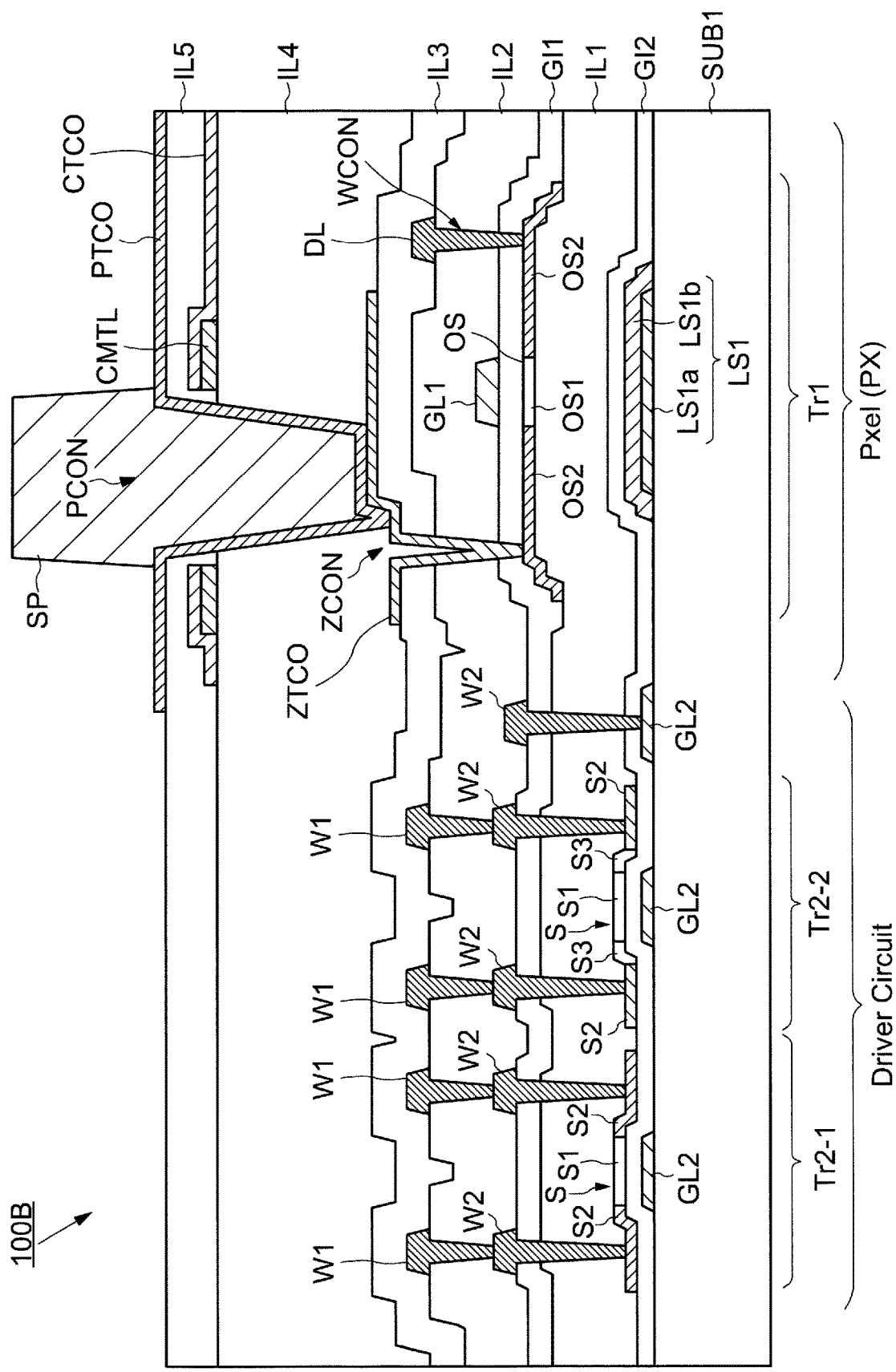
FIG. 11 is a cross-sectional view of a configuration of a first substrate side of a liquid crystal display device according to an embodiment of the present invention.

FIG. 11 shows a cross-sectional view of a first substrate SUB1, which is one of the substrates configuring a liquid crystal display device 100B. The liquid crystal display device 100B shown in FIG. 11 has the same structure on the lower layer side from the fourth insulating layer IL4, but the configuration of a pixel electrode PTCO and a common electrode CTCO is different.

As shown in FIG. 11, a common auxiliary electrode CMTL and a common electrode CTCO are arranged. A fifth insulating layer IL5 is arranged above the common auxiliary electrode CMTL and the common electrode CTCO. The pixel electrode PTCO is arranged on top of the fifth insulating layer IL5. The pixel electrode PTCO is connected to a connecting electrode ZTCO in a contact hole PCON that passes through the fourth insulating layer IL4 and the fifth insulating layer TL5. A spacer SP may be arranged in the region of the contact hole PCON.

The liquid crystal display device 100B has a structure in which the pixel electrode PTCO is arranged across the insulating layer above the common electrode CTCO. Next, the structure of a first pixel PX1B in the liquid crystal display device 100B will be described with reference to FIG. 12.

Figure 12:
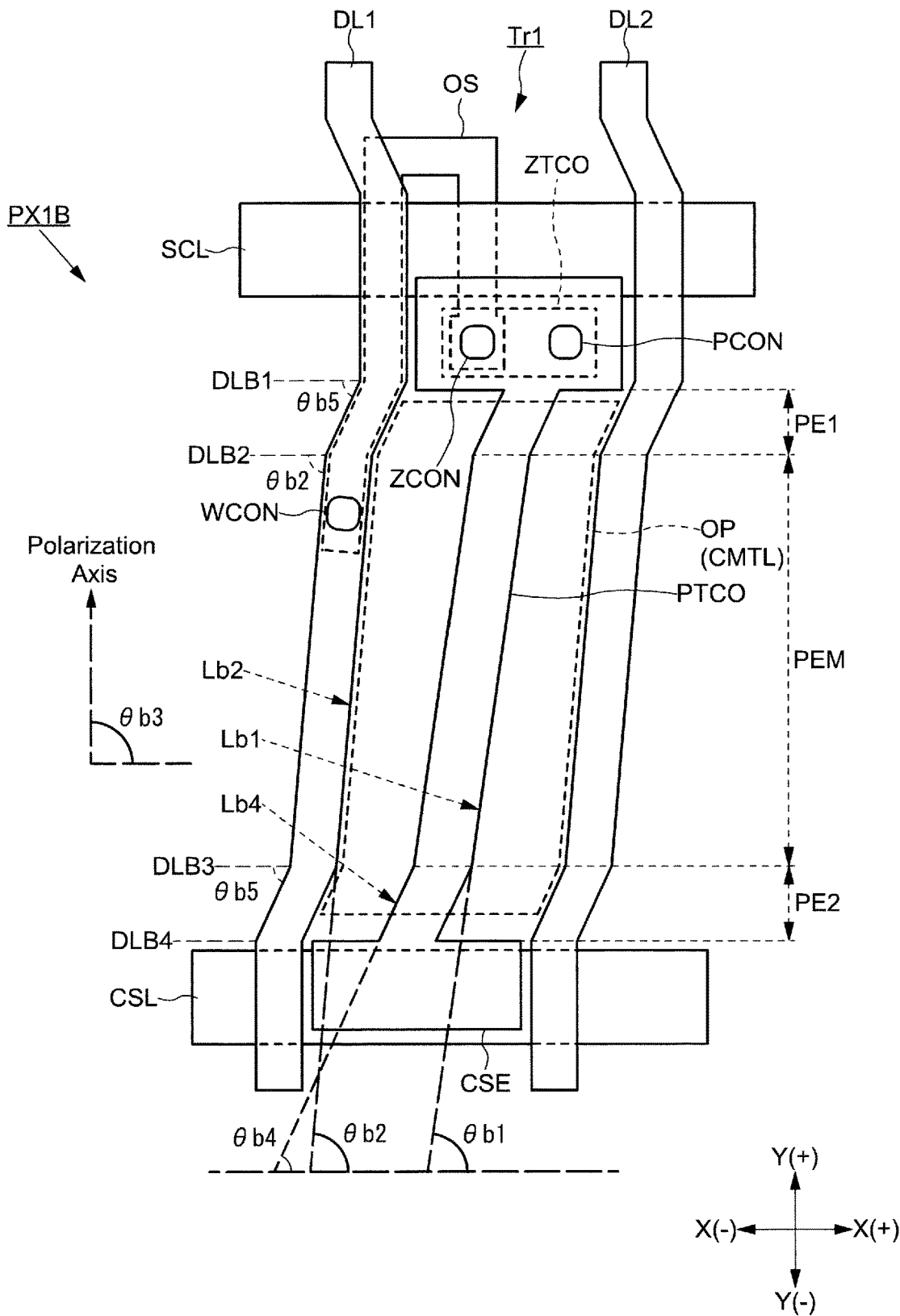
FIG. 12 is a plan view of a detailed configuration of a pixel of a liquid crystal display device according to an embodiment of the present invention.

FIG. 12 shows a plan view of the first pixel PX1B. The first pixel PX1B includes a first transistor T1, a first pixel electrode PTCO1, and the common electrode CTCO. The common electrode CTCO is an electrode shared by a plurality of pixels and has a size that occupies the entire first pixel PX1, so the indication of its shape is omitted in FIG. 12.

The first transistor Tr is formed by a semiconductor layer OS. The semiconductor layer OS has an island-shaped bent pattern and is arranged to intersect a scanning signal line SCL twice. Since the region where the scanning signal line SCL intersects the semiconductor layer OS functions as the gate electrode, the first transistor Tr has two channel regions. The first transistor Tr is connected to a first data signal line DL1 at a contact hole WCON and is connected to the connecting electrode ZTCO at a contact hole ZCON. The pixel electrode PTCO is arranged between the first data signal line DL1 and the second data signal line DL2 and is connected to the connecting electrode ZTCO at the contact hole PCON. The wiring pattern that bends is the same for the second data signal line DL2.

The pixel electrode PTCO is connected to the connecting electrode ZTCO at one end and to a capacitance electrode CSE at the other end extending in the Y-axis direction. The capacitance electrode CSE is arranged so that it overlaps a capacitance line CSL extending in the X-axis direction.

As shown in FIG. 12, the scanning signal line SCL extends in the X-axis direction and the first data signal line DL1 extends in the Y-axis direction. The first data signal line DL1 is orthogonal to the scanning signal line SCL and has a pattern that bends multiple times in a region adjacent to the pixel electrode PTCO. For example, the first data signal line DL1 bends at an angle of $\theta b5$ ($\theta b5 \ne 90$ degrees) to the X-axis at the bent portion DLB1 and bends at an angle of $\theta b2$ ($\theta b2 > \theta b5$) to the X-axis at the bent portion DLB2. The first data signal line DL1 bends at an angle of $\theta b5$ to the X-axis again at the bent portion DLB3, and bends at a right angle to the X-axis at the bent portion DLB4, and is orthogonal to the capacitance line CSL.

The pixel electrode PTCO has a pattern that bends in the same way as the data signal lines in the region surrounded by the scanning signal line SCL and capacitance line CSL, and the first data signal line DL1 and the second data signal line DL2. FIG. 12 shows the pixel electrode PTCO divided into the pixel electrode center portion PEM and the pixel electrode end portions PE1, PE2 for explanation. The pixel electrode center portion PEM of the pixel electrode PTCO is the main part of the pixel electrode. The pixel electrode end portion PE1 of the pixel electrode PTCO is the portion on the side connected to the semiconductor layer OS, and the pixel electrode end portion PE2 is the portion on the side connected to the capacitance electrode CSE.

The pixel electrode center portion PEM of the pixel electrode PTCO has a strip pattern extending in the Y-axis direction, and is not parallel to the Y-axis but inclined in the X-axis direction. In other words, the pixel electrode center portion PEM of the pixel electrode PTCO is inclined corresponding to the inclination of the first data signal line DL1. The inclination angle of the pixel electrode center portion PEM of the pixel electrode PTCO is different from that of the first data signal line DL1. For example, when one side of the pixel electrode center portion PEM is Lb1 and one side between the bent portion DLB2 and the bent portion DLB3 of the first data signal line DL1 is Lb2, the first angle $\theta b1$ formed by the side Lb1 relative to the X-axis and the second angle $\theta b2$ formed by the side Lb2 relative to the X-axis are different. Specifically, the first angle $\theta b1$ and the second angle $\theta b2$ differ in the range from 1 degree to 5 degrees, preferably from 1 degree to 3 degrees. FIG. 12 shows a case where the first angle $\theta b1$ is smaller than the second angle $\theta b2$ in the above range, but the first angle $\theta b1$ may be larger than the second angle $\theta b2$ in the above range.

The pixel electrode edge portions PE1, PE2 of the pixel electrode PTCO are tilted at an angle different from that of the pixel electrode center portion PEM. For example, as shown in FIG. 12, when one side of the pixel electrode end portion PE2 of the pixel electrode PTCO is Lb4, the angle that this side Lb4 makes with the X-axis is expressed as $\theta b4$. The fourth angle $\theta b4$ is smaller than the first angle $\theta b1$ ($\theta b4 < \theta b1$). As is clear from the relationship between the first angle $\theta b1$ and the fourth angle $\theta b4$, the pixel electrode end portion PE2 of the pixel electrode PTCO is tilted in the direction of the first data signal line DL1 from the center portion PEM of the pixel electrode.

The pixel electrode end portion PE1 of the pixel electrode PTCO has the shape of the inverted pixel electrode end portion PE2, and is inclined in the direction of the second data signal line DL2. Thus, the strip of the pixel electrode PTCO has two bends, and the pixel electrode center portion PEM, which is the main configuration of the pixel electrode, has the pixel electrode end portions PE1, PE2 on both sides of the pixel electrode center portion PEM inclined in the direction of the data signal line DL. Furthermore, a configuration in which said fourth angle $\theta b4$ is different from the first angle $\theta b1$ and the second angle $\theta b2$ can be adopted, and a configuration in which any two or three angles are the same can also be adopted.

Although not shown in FIG. 12, an alignment film is arranged over the pixel electrode PTCO. The alignment film is subjected to an alignment treatment (for example, rubbing treatment, photo-alignment treatment). The direction of the alignment treatment to the alignment film is formed so that the direction is the same as the direction of the polarizing axis of the polarizing plate. The third angle $\theta b3$ formed by the polarization axis with respect to the X-axis direction is, for example, 90 degrees. The second angle $\theta b2$ of the first data signal line DL1 with respect to the polarization axis should be inclined in the range of 10±2 degrees.

One side of the opening OP of the common auxiliary electrode CMTL along the first data signal line DL11 is inclined at the same angle as the second angle $\theta b2$ to the X-axis. Since the opening OP functions as a light-shielding layer, the same explanation as above can be made by replacing the angle of said one side of the opening OP with the second angle $\theta b2$ of the first data signal line DL1.

Although the stacking order of the second pixel electrode PTCO2 and the common electrode CTCO is different in this embodiment of the liquid crystal display 100B, it is possible to prevent periodic shading (stripe pattern) from being visible when the image displayed on the screen of the display device 100B is magnified through a lens by varying the angle of the strip pattern of the pixel electrode PTCO in the direction in which the data signal line DL extends within a predetermined range.

Each of the embodiments described above as an embodiment of the present invention may be combined as appropriate to the extent that they do not contradict each other. Based on the liquid crystal display device of each embodiment, any addition, deletion, or design change of configuration elements, or any addition, omission, or change of conditions of a process made by a person skilled in the art as appropriate, is also included in the scope of the present invention as long as it has the gist of the invention.

It is understood that other advantageous effects different from the advantageous effects brought about by each of the above-described embodiments, which are obvious from the description herein or which can be easily foreseen by those skilled in the art, are naturally brought about by the present invention.

What is claimed is:

1. A liquid crystal display device, comprising:
   at least one scanning signal line extending in a first direction;
   at least one data signal line intersecting the at least one scanning signal line; and
   a pixel including a pixel electrode, a common electrode opposite the pixel electrode, and a liquid crystal layer, wherein:
   the common electrode includes a slit arranged in a region overlapping the pixel electrode;
   the slit includes a slit center portion that has a middle part of the slit in a second direction orthogonal to the first direction;
   the slit center portion has a side that is a portion of a periphery of the slit and is a straight line extending a third direction that is different from the first direction and the second direction;
   the first direction and the third direction make a first angle;
   the at least one data signal line includes a portion that is adjacent to the slit center portion, faces the middle part, and extends at a second angle with respect to the first direction;
   the first angle and the second angle are acute angles,
   the first angle is one of a positive angle and a negative angle with respect to the first direction,
   the second angle is the one of the positive angle and the negative angle with respect to the first direction, and
   the first angle and the second angle are different in a range of 1 degree to 5 degrees.

2. The liquid crystal display device according to claim 1, wherein:
   the slit includes a slit end portion continuous from at least one end of the slit center portion; and
   the slit end portion extends from the at least one end of the slit center portion inclining in the direction of the at least one data signal line.

3. The liquid crystal display device according to claim 1, further comprising a light shielding layer having an opening overlapping the at least one scanning signal line and the at least one data signal line and overlapping at least a portion of the pixel electrode and the slit, wherein
   one side of the opening along the at least one data signal line includes a region inclined at the same angle as the second angle.

4. The liquid crystal display device according to claim 1, wherein:
   the at least one scanning signal line comprises a plurality of scanning signal lines, the plurality of scanning signal lines include a first scanning signal line and a second scanning signal line spaced apart from the first scanning signal line;
   the at least one data signal line has two bend portions between the first scanning signal line and the second scanning signal line; and
   the at least one data signal line has a straight portion between the two bend portions inclined at the same angle as the second angle.

5. The liquid crystal display device according to claim 1, further comprising a first polarizing plate having a first polarization axis and a second polarizing plate having a second polarization axis perpendicular to the first polarization axis,
   wherein the first angle and the second angle intersect the first polarization axis and the second polarization axis.

* * * * *